United States Patent
Denis et al.

(10) Patent No.: US 9,050,559 B2
(45) Date of Patent: Jun. 9, 2015

(54) SYSTEM AND METHOD FOR ACCOMMODATING AFTERTREATMENT BRICKS

(71) Applicant: Caterpillar Inc., Peoria, IL (US)

(72) Inventors: Andrew M. Denis, Peoria, IL (US); Thomas W. Manning, Metamora, IL (US); Ian Aguirre, Peoria, IL (US); Rick E. Jeffs, Peoria, IL (US); Nagaraju Manchikanti, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 222 days.

(21) Appl. No.: 13/782,251

(22) Filed: Mar. 1, 2013

(65) Prior Publication Data
US 2014/0248186 A1    Sep. 4, 2014

(51) Int. Cl.
| B01D 50/00 | (2006.01) |
| B01D 53/86 | (2006.01) |
| F01N 3/28 | (2006.01) |
| F01N 3/10 | (2006.01) |
| F01N 3/20 | (2006.01) |
| F01N 13/00 | (2010.01) |

(52) U.S. Cl.
CPC ........... *B01D 53/86* (2013.01); *Y10T 29/49947* (2015.01); *F01N 3/28* (2013.01); *F01N 3/10* (2013.01); *F01N 3/2066* (2013.01); *F01N 2450/24* (2013.01); *F01N 2450/30* (2013.01); *F01N 2470/02* (2013.01); *F01N 2470/22* (2013.01); *F01N 2590/10* (2013.01); *F01N 13/017* (2014.06)

(58) Field of Classification Search
CPC ...... F01N 3/28; B01D 53/86; Y10T 29/49947
USPC ............... 422/168, 177; 55/523; 60/311
See application file for complete search history.

(56) References Cited

U.S. PATENT DOCUMENTS

| 3,891,396 | A | | 6/1975 | Musall et al. |
| 4,163,042 | A | | 7/1979 | Lynch |
| 4,367,081 | A | * | 1/1983 | Harvey ........................... 55/503 |
| 4,488,889 | A | * | 12/1984 | McCarroll ..................... 55/502 |
| 5,082,479 | A | | 1/1992 | Miller |
| 5,169,604 | A | | 12/1992 | Crothers, Jr. |
| 5,378,435 | A | | 1/1995 | Gavoni |

(Continued)

FOREIGN PATENT DOCUMENTS

| DE | 2422110 A1 | 11/1975 |
| GB | 1052106 A | 12/1966 |
| GB | 1410134 A | 10/1975 |

*Primary Examiner* — Tom P Duong
(74) *Attorney, Agent, or Firm* — Leydig, Voit & Mayer, Ltd.

(57) ABSTRACT

An aftertreatment system and method treats exhaust gasses produced by an internal combustion process or a similar process. The aftertreatment system includes an aftertreatment module having a sleeve extending between a first end and a second end. One or more aftertreatment bricks are axially inserted into a sleeve opening disposed in the first end of the sleeve. To prevent the aftertreatment bricks from unintentionally exiting the sleeve, a captive ring is disposed around the first end of the sleeve as a loose fitting collar. The captive ring is restrained on the sleeve by a circumferential bead protruding about the first end. The captive ring can couple with a retention ring placed adjacent the first end. When coupled to the captive ring, a portion of the retention ring extends partially across and blocks the sleeve opening, preventing the aftertreatment brick from exiting the sleeve.

10 Claims, 6 Drawing Sheets

(56) References Cited

U.S. PATENT DOCUMENTS

| | | | |
|---|---|---|---|
| 5,408,827 A * | 4/1995 | Holtermann et al. | 60/298 |
| 5,832,720 A | 11/1998 | Svahn | |
| 6,568,078 B2 | 5/2003 | Eisenstock | |
| 6,632,406 B1 * | 10/2003 | Michelin et al. | 422/178 |
| 6,660,235 B1 | 12/2003 | Holpp et al. | |
| 6,780,292 B2 | 8/2004 | Hermann et al. | |
| 6,877,780 B2 * | 4/2005 | Potts et al. | 285/420 |
| 7,249,790 B2 * | 7/2007 | Potts et al. | 285/420 |
| 7,404,254 B2 | 7/2008 | Kurth et al. | |
| 7,517,380 B2 | 4/2009 | Grimm et al. | |
| 7,565,743 B2 | 7/2009 | Whittenberger et al. | |
| 7,582,267 B1 * | 9/2009 | Klein et al. | 422/180 |
| 7,713,493 B2 * | 5/2010 | Bosanec et al. | 422/180 |
| 7,918,914 B2 | 4/2011 | Sudmanns et al. | |
| 7,919,052 B2 | 4/2011 | Ahmed | |
| 7,993,597 B2 | 8/2011 | Kinomoto et al. | |
| 8,062,602 B2 | 11/2011 | Roe et al. | |
| 8,092,748 B2 | 1/2012 | Forster et al. | |
| 8,580,003 B2 * | 11/2013 | Mitsuda | 55/318 |
| 8,932,531 B2 * | 1/2015 | Muter et al. | 422/177 |
| 2009/0113709 A1 | 5/2009 | Mueller et al. | |
| 2009/0249754 A1 | 10/2009 | Amirkhanian et al. | |
| 2011/0155263 A1 * | 6/2011 | Mitsuda et al. | 137/343 |
| 2011/0223819 A1 | 9/2011 | Kazuta | |

* cited by examiner

SYSTEM AND METHOD FOR ACCOMMODATING AFTERTREATMENT BRICKS

TECHNICAL FIELD

This patent disclosure relates generally to an aftertreatment system for reducing emissions in exhaust gasses from a combustion process and, more particularly, to a method and arrangement for retaining and replacing aftertreatment bricks in such a system.

BACKGROUND

Power systems such as, for example, large internal combustion engines burn hydrocarbon-based fuels or similar fuel sources to convert the chemical energy therein to mechanical energy that can be utilized to power an associated machine or application. Combustion of the hydrocarbon fuel may release or create several byproducts or emissions, such as nitrogen oxides ($NO_x$), carbon monoxides and carbon dioxides (CO and $CO_2$), and particulate matter. The quantity of some of these emissions that may be released to the environment may be subject to government regulations and environmental laws. Accordingly, manufacturers of such power systems may equip the system with an associated aftertreatment system to treat the emissions before they are discharged to the environment.

The aftertreatment system can be disposed in the exhaust channel of the power system and may include a unit or module through which the exhaust gasses may pass. The module may include one or more aftertreatment bricks that can change, chemically or physically, the composition of the exhaust gasses that encounter the bricks. Examples of aftertreatment bricks include catalysts that chemically alter the exhaust gasses and filters that can trap specific components of the exhaust gasses. In some embodiments, the aftertreatment brick may be permanently fixed to the module, for example, by welding or the like. However, some types of aftertreatment bricks may become depleted or deactivated after a period of use, or may become damaged due to the conditions in which they are used, and require replacement. Accordingly, in some aftertreatment systems the aftertreatment bricks may be removable.

An example of a system using removable aftertreatment bricks, and particularly catalysts, is described in U.S. Pat. No. 7,919,052 (the '052 patent). The '052 patent describes a housing defining an opening that is part of a flow chamber and a catalyst that is disposed over the opening. To retain the catalyst in place over the opening, a bar is placed across one face of the catalyst perpendicular to the flow chamber. One end of the bar is anchored at the bottom of the flow chamber and the other end is fastened by a bolt-and-nut combination to a front plate at the upper portion of the housing. To remove the catalyst, the bar must be both unbolted from the housing and unanchored from the bottom of the flow channel. Moreover, the bolt-and-nut combination and the anchor may be oriented in different directions, complicating removal of the bar to access the catalyst.

SUMMARY

The disclosure describes, in an aspect, an aftertreatment module including at least one sleeve extending between a first end and an opposing second end along a sleeve axis. The sleeve further includes a sleeve opening disposed at the first end and a bead proximate the first end and protruding radially about the sleeve axis. The sleeve can be accommodated in a frame having a planar surface perpendicular to the sleeve axis. When the sleeve is accommodated in the frame, the first end extends from the planar surface and the bead is axially spaced from the planar surface. One or more aftertreatment bricks can be inserted in the sleeve. The aftertreatment bricks can have a substrate matrix and a mantle disposed around the substrate matrix. To retain the aftertreatment bricks in the sleeve, a captive ring can be disposed around the sleeve and axially positioned between the planar surface and the bead. A retention ring is placed adjacent to the first end and coupled with the captive ring such that a portion of the retention ring is disposed over a portion of the sleeve opening.

The disclosure describes, in another aspect, a method of retaining an aftertreatment brick in an aftertreatment module. According to the method, a sleeve is provided in the aftertreatment module and a captive ring is loosely disposed about a first end of the sleeve. One or more aftertreatment bricks are inserted through a sleeve opening in the first end of the sleeve. A retention ring is positioned near the first end such that a portion of the retention ring blocks a portion of the sleeve opening and the captive ring is coupled to the retention ring.

In another aspect, the disclosure describes a method of sealing a plurality of aftertreatment bricks inserted in an aftertreatment module. A sleeve extending between a first end and a second end to delineate a sleeve axis is provided in the aftertreatment module. The method involves disposing a captive ring about the first end generally concentric to the sleeve axis such that the captive ring is axially restrained behind a bead radially protruding proximate the first end. A first aftertreatment brick and a second aftertreatment brick are inserted into a sleeve opening disposed in the first end such the first aftertreatment brick is proximate the first end and the second aftertreatment brick is proximate the second end. A retention ring is positioned proximate the first end such that a portion of the retention ring extends over a portion of the sleeve opening and contacts the first aftertreatment brick. According to the method, the first aftertreatment brick is urged against the second aftertreatment brick by coupling and tightening the retention ring to the captive ring abutting the bead.

DETAILED DESCRIPTION

Figure 1:
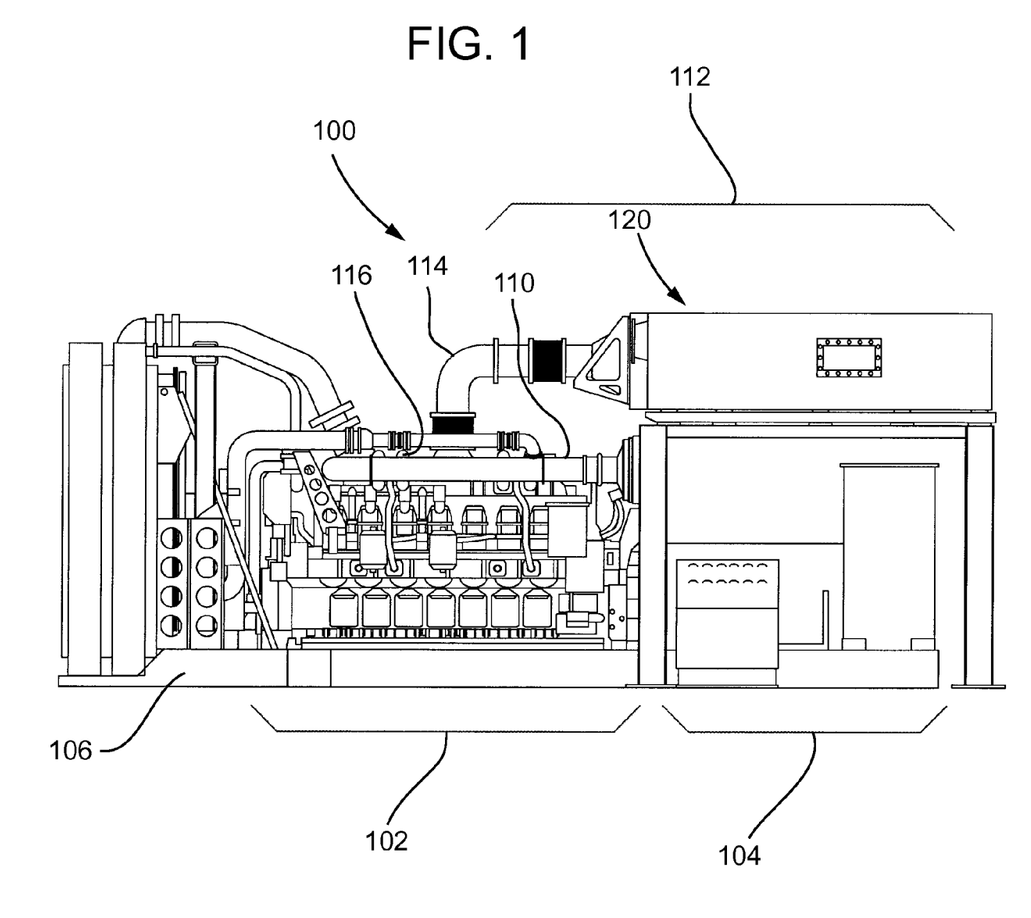
FIG. 1 is a side elevational view of a power system including an internal combustion engine coupled to a generator and associated with an aftertreatment module.

This disclosure relates generally to an exhaust aftertreatment system that may be associated with a power system producing exhaust gasses and, more particularly, relates to aftertreatment bricks that may be a removable component of such aftertreatment systems. Now referring to the drawings, wherein like reference numbers refer to like elements, there is illustrated in FIG. 1 an example of a power system 100 that can generate power by combusting fossil fuels or the like. The illustrated power system 100 can include an internal combustion engine 102 such as a diesel engine operatively coupled to a generator 104 for producing electricity. The internal combustion engine 102 may have any number of cylinders as may be appreciated by one of ordinary skill in the art. The internal combustion engine 102 and the generator 104 can be supported on a common mounting frame 106. The power system 100 can provide on-site stand-by power or continuous electrical power at locations where access to an electrical grid is limited or unavailable. Accordingly, the generator 104 and internal combustion engine 102 can be scaled or sized to provide suitable wattage and horsepower. It should be appreciated that in other embodiments, the power system of the present disclosure can be utilized in other applications such as gasoline burning engines, natural gas turbines, and coal burning systems. Further, in addition to stationary applications, the present disclosure can be utilized in mobile applications such as locomotives and marine engines.

To direct intake air into and exhaust gasses from the power system 100, the power system can include an air introduction system 110 and an exhaust system 112. The air introduction system 110 introduces air or an air/fuel mixture to the combustion chambers of the internal combustion engine 102 for combustion while the exhaust system 112 includes an exhaust pipe or exhaust channel 114 in fluid communication with the combustion chambers to direct the exhaust gasses produced by the combustion process to the environment. To pressurize intake air by utilizing the positive pressure of the expelled exhaust gasses, the power system 100 can include one or more turbochargers 116 operatively associated with the air introduction system 110 and the exhaust system 112.

The exhaust system 112 can include components to condition or treat the exhaust gasses before they are discharged to the environment. For example, an exhaust aftertreatment system 120 in the form of a clean emissions module (CEM) can be disposed in fluid communication with the exhaust system 112 downstream of the turbochargers 116 to receive the exhaust gasses discharged from the internal combustion engine 102. The term "aftertreatment" refers to the fact that the system treats exhaust gasses after they have been produced and is therefore distinguishable from fuel additives and the like that affect the combustion process. The aftertreatment system 120 can be designed as a separate unit that can be mounted to the power system 100 generally over the generator 104, for example, and can receive exhaust gasses from the exhaust channel 114. By manufacturing the aftertreatment system 120 as a separate modular unit, the design can be utilized with different sizes and configurations of the power system 100. However, in other embodiments, the aftertreatment system 120 can be integral with the power system 100 and can be disposed at other locations rather than above the power system. The aftertreatment system 120 can be configured to treat, remove or convert regulated emissions and other constituents in the exhaust gasses.

Figure 2:
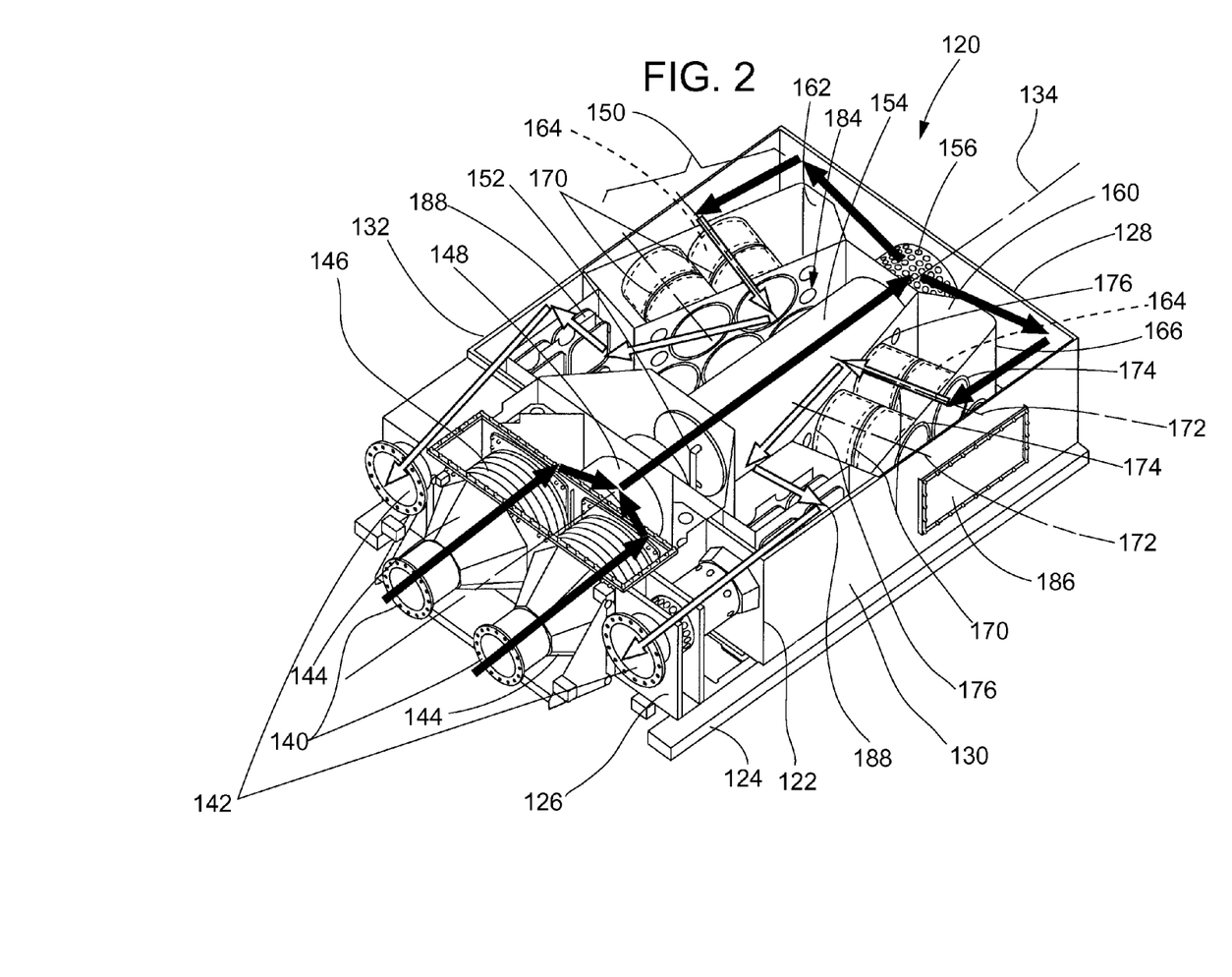
FIG. 2 is a perspective view of the clean emissions module with the top removed to illustrate the components inside of, and exhaust flow through, the module.

Referring to FIG. 2, the aftertreatment system 120 can include a box-like housing 122 that is supported on a base support 124 adapted to mount the aftertreatment system to the power system. The box-like housing 122 can include a forward-directed first wall 126, an opposing rearward second wall 128, and respective third and fourth sidewalls 130, 132. However, it should be appreciated that terms like forward, rearward and side are used only for orientation purposes and should not be construed as a limitation on the claims. Additionally, extending between the forward first wall 126 and rearward second wall 128 and located midway between the third and fourth sidewalls 130, 132 can be an imaginary central system axis line 134. The housing 122 may be made from welded steel plates or sheet material.

To receive the untreated exhaust gasses into the aftertreatment system 120, one or more inlets 140 can be disposed through the first wall 126 of the housing 122 and can be coupled in fluid communication to the exhaust channel from the exhaust system. In the embodiment illustrated, the aftertreatment system 120 includes two inlets 140 arranged generally in parallel and centrally located between the third and fourth sidewalls 130, 132 on either side of the system axis line 134 so that the entering exhaust gasses are directed toward the rearward second wall 128. However, other embodiments of the aftertreatment system 120 may include different numbers and/or locations for the inlets. To enable the exhaust gasses to exit the aftertreatment system 120, two outlets 142 can also be disposed through the first wall 126 of the housing 122. Each outlet 142 can be parallel to the centrally oriented inlets 140 and can be disposed toward one of the respective third and fourth sidewalls 130, 132.

To treat or condition the exhaust gasses, the housing 122 can contain various types or kinds of exhaust treatment devices through or past which the exhaust gasses are directed. For example and following the arrows indicating exhaust flow through the aftertreatment system 120, in order to slow the velocity of the incoming exhaust gasses for treatment, the inlets 140 can each be communicatively associated with an expanding, cone-shaped diffuser 144 mounted exteriorly of the front first wall 126. Each diffuser 144 can direct the exhaust gasses to an associated diesel oxidation catalyst (DOC) 146 located proximate the first wall 126 inside the housing 122 that then directs the exhaust gasses to a common collector duct 148 centrally aligned along the system axis line 134. The DOC 146 can contain materials such as platinum group metals like platinum or palladium which can catalyze carbon monoxide and hydrocarbons in the exhaust gasses to water and carbon dioxide via the following possible reactions:

$$CO + \tfrac{1}{2}O_2 = CO_2 \qquad (1)$$

$$[HC] + O_2 = CO_2 + H_2O \qquad (2)$$

To further reduce emissions in the exhaust gasses and, particularly, to reduce nitrogen oxides such as NO and $NO_2$, sometimes referred to as $NO_X$, the aftertreatment system may include an SCR system 150. In the SCR process, a liquid or gaseous reductant agent is introduced to the exhaust system and directed through an SCR catalyst along with the exhaust gasses. The SCR catalyst can include materials that cause the exhaust gasses to react with the reductant agent to convert the $NO_X$ to nitrogen ($N_2$) and water ($H_2O$). A common reductant agent is urea (($NH_2)_2CO$), though other suitable substances such as ammonia (NH$_3$) can be used in the SCR process. The reaction may occur according to the following general formula:

$$NH_3 + NO_X = N_2 + H_2O \qquad (3)$$

Referring to FIG. 2, to introduce the reductant agent, the SCR system 150 includes a reductant injector 152 located downstream of the collector duct 148 and upstream of a centrally aligned mixing duct 154 that channels the exhaust gasses toward the rearward second wall 128 of the housing 122. The reductant injector 152 can be in fluid communication with a storage tank or reservoir storing the reductant agent and can periodically, or continuously, inject a measure of the reductant agent into the exhaust gas stream in a process sometimes referred to as dosing. The amount of reductant agent introduced can be dependent upon the NO$_X$ load of the exhaust gasses. The elongated mixing duct 154 uniformly intermixes the reductant agent with the exhaust gasses before they enter the downstream SCR catalysts. Disposed at the end of the mixing duct 154 proximate the second wall 128 can be a diffuser 156 that redirects the exhaust gas/reductant agent mixture toward the third and fourth sidewalls 130, 132 of the aftertreatment system 120. The third and fourth sidewalls 130, 132 can redirect the exhaust gas/reductant agent mixture generally back towards the front first wall 126.

Figure 3:
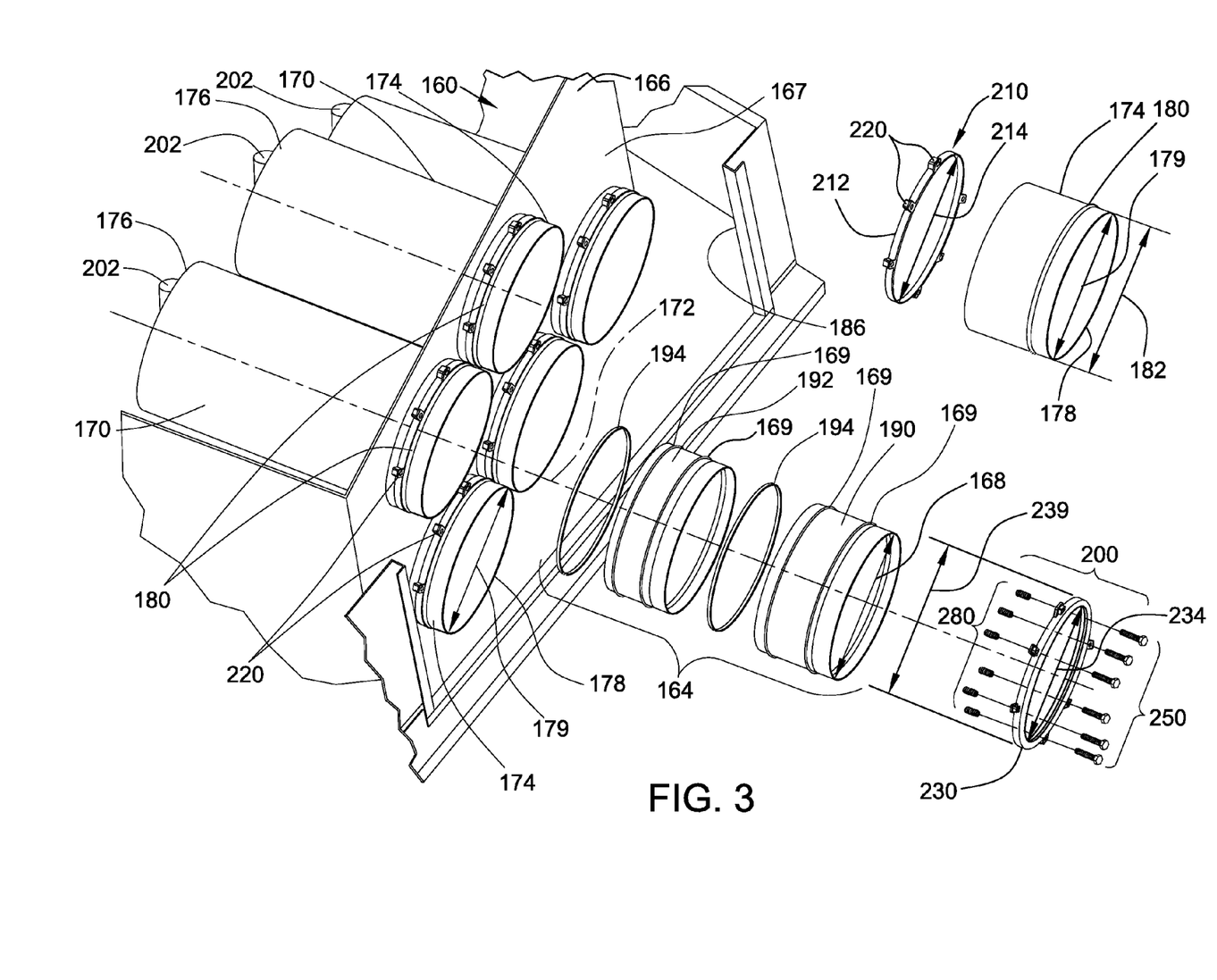
FIG. 3 is a perspective view of an aftertreatment module disposed in the clean emissions module, the aftertreatment module including at least one sleeve receiving a plurality of aftertreatment bricks and a pair of rings that couple together proximate the end of the sleeve to retain the aftertreatment bricks therein.

To perform the SCR reaction process, the aftertreatment system 120 can include a first SCR module 160 disposed proximate the third sidewall 130 and a second SCR module 162 disposed toward the fourth sidewall 132. The first and second SCR modules 160, 162 are oriented to receive the redirected exhaust gas/reductant agent mixture. Referring to FIGS. 2 and 3, the first and second SCR modules 160, 162 include a support structure or frame 166 that can accommodate one or more SCR catalysts 164 (of which only mantles but not substrates appear in FIG. 3), sometimes referred to as aftertreatment bricks. The term aftertreatment brick, however, may refer to a variety of exhaust aftertreatment devices which SCR catalysts are a subset of. Accordingly, in other embodiments, different types of aftertreatment bricks operating by different reaction processes may be substituted in the first and second SCR modules 160, 162. Further, although the illustrated plurality of SCR catalysts 164 are generally cylindrical and have an outer catalyst diameter 168, the SCR modules 160, 162 may be configured to accommodate aftertreatment bricks of different shapes, sizes and/or configurations. Accordingly, the described embodiments of aftertreatment bricks are by way of example only and should not be construed as limitations on the claims unless clearly stated otherwise.

To hold the plurality of SCR catalysts 164, the SCR modules 160, 162 can include one or more sleeves 170 that can slidably receive the catalysts. The sleeves 170 can be generally elongated, hollow tubular structures having a first end 174 and an opposing second end 176 aligned along a longitudinal sleeve axis 172. In some embodiments, the first end 174 can be designated an upstream end and the second end 176 can be designated a downstream end thereby directing gas flow through the sleeve 170. In other embodiments, the system may be at least partially reversible so that either of the first and second ends may act as an upstream or downstream end. In those embodiments that include more than one sleeve 170 in the first and second SCR modules 160, 162, the sleeves can be supported in a truss-like frame 166 made, for example, from formed sheet metal or cast materials. The frame 166 may include one or more walls or planar surfaces 167, which may be solid or opened such as a lattice, that are vertically arranged in the housing 122 of the aftertreatment module 120.

The frame 166 can be oriented so that the first ends 174 are directed toward the respective third and fourth sidewalls 130, 132 and the second ends 176 communicate with a central region 184 of the aftertreatment system 120. To receive exhaust gasses into the sleeves 170, the first ends 174 may protrude or extend from the planar surface 167 of the frame 166 so that a portion of the exterior of the sleeve is exposed. To access the first and second SCR modules 160, 162, for example to retrieve and replace the plurality of SCR catalysts 164, one or more access panels 186 can be disposed in the respective third and fourth sidewalls 130, 132 positioned toward the modules. The central region 184 can direct the received exhaust gasses forward to the outlets 142 disposed through the front first wall 126. In various embodiments, one or more additional exhaust treatment devices can be disposed in the aftertreatment system 120 such as diesel particulate filters 188 for removing soot.

Referring to FIG. 3, to enable the tubular sleeves 170 to receive the plurality of SCR catalysts 164, the first end 174 of each sleeve can delineate a sleeve opening 178 through which the catalysts can be inserted. The sleeve 170 and the plurality of SCR catalysts 164 can have complementary circular or cylindrical shapes, although in other embodiments, other shapes are contemplated. To provide a clearance fit to enable insertion, the sleeve opening 178 can have a first width dimension such as, more specifically a sleeve diameter 179, that is equal to or slightly larger than second cross-sectional dimension associated with the plurality of SCR catalysts 164 such as the catalyst diameter 168. The dimensions of the catalyst diameter 168 and the sleeve diameter 179 can be sized to provide a 2-3 millimeter gap, for example, between portions of the catalysts and the sleeve 170. Therefore, to prevent leakage of the exhaust gasses/reductant agent mixture between the plurality of SCR catalysts 164 and the sleeve 170, the two components can be adapted to form a sealing engagement with each other. For example, one or more circular ribs 169 can protrude radially about the circumference of each of the plurality of SCR catalysts 164 and form a seal or slight interference fit with the inner surface of the sleeves 170. Due to the complementary fit between the sleeve 170 and the plurality of SCR catalysts 164, the catalysts can be positioned into concentric alignment with the sleeve axis 172.

In an embodiment, the axial length of the sleeves 170 between the first end 174 and second end 176 can be sized to be generally coextensive with the combined length of the plurality of SCR catalysts 164. For example, in the illustrated embodiment, the sleeve 170 can receive a first catalyst 190 and a second catalyst 192 that are arranged and axially inserted into the sleeve. The first catalyst 190 can be oriented toward the first end 174 and the second catalyst 192 can be oriented toward the second end 176. In other embodiments, three or more catalysts can be received into the sleeve. Once inserted, the plurality of SCR catalysts 164 are arranged adjacent to each other in a stacked, abutting relationship and can be substantially coextensive with the length of the sleeve 170. To further seal the plurality of SCR catalysts 164 and the sleeve 170, one or more gaskets 194 can be disposed between the adjacent first and second catalysts 190, 192 and between the second catalyst and the second end 176 of the sleeve. The gaskets 194 may be thin metal crush gaskets that may be coated with materials such as graphite or the gaskets may be made from compressible elastomeric materials.

To retain and confine the plurality of SCR catalysts 164 in the tubular sleeve 170, a first retention mechanism or retainer 200 and a second retainer 202 can be included to engage the respective first end 174 and second end 176 of the sleeve. Although the disclosure describes the first and second retainers 200, 202 with respect to the first SCR module 160, it should be appreciated that similar retainers may be utilized with the second SCR module 162. When installed, the first and second retainers 200, 202 can constrain or prevent axially displacement of the plurality of SCR catalysts 164 with respect to the sleeve 170 thereby preventing unintentional removal of a catalyst from the sleeve. However, the first and second retainers 200, 202 can be configured to allow exhaust gasses to enter and exit the sleeves 170 while retaining the catalysts. For example, the second retainer 202 can be a bar, a grate, or the like traversing the downstream end 176 and permanently fastened thereto by welding, brazing or the like. To facilitate removal and replacement of the SCR catalysts 164, the first retainer 200 can be configured to repeatedly engage and disengage with the first end 174.

Figures 4, 4A:
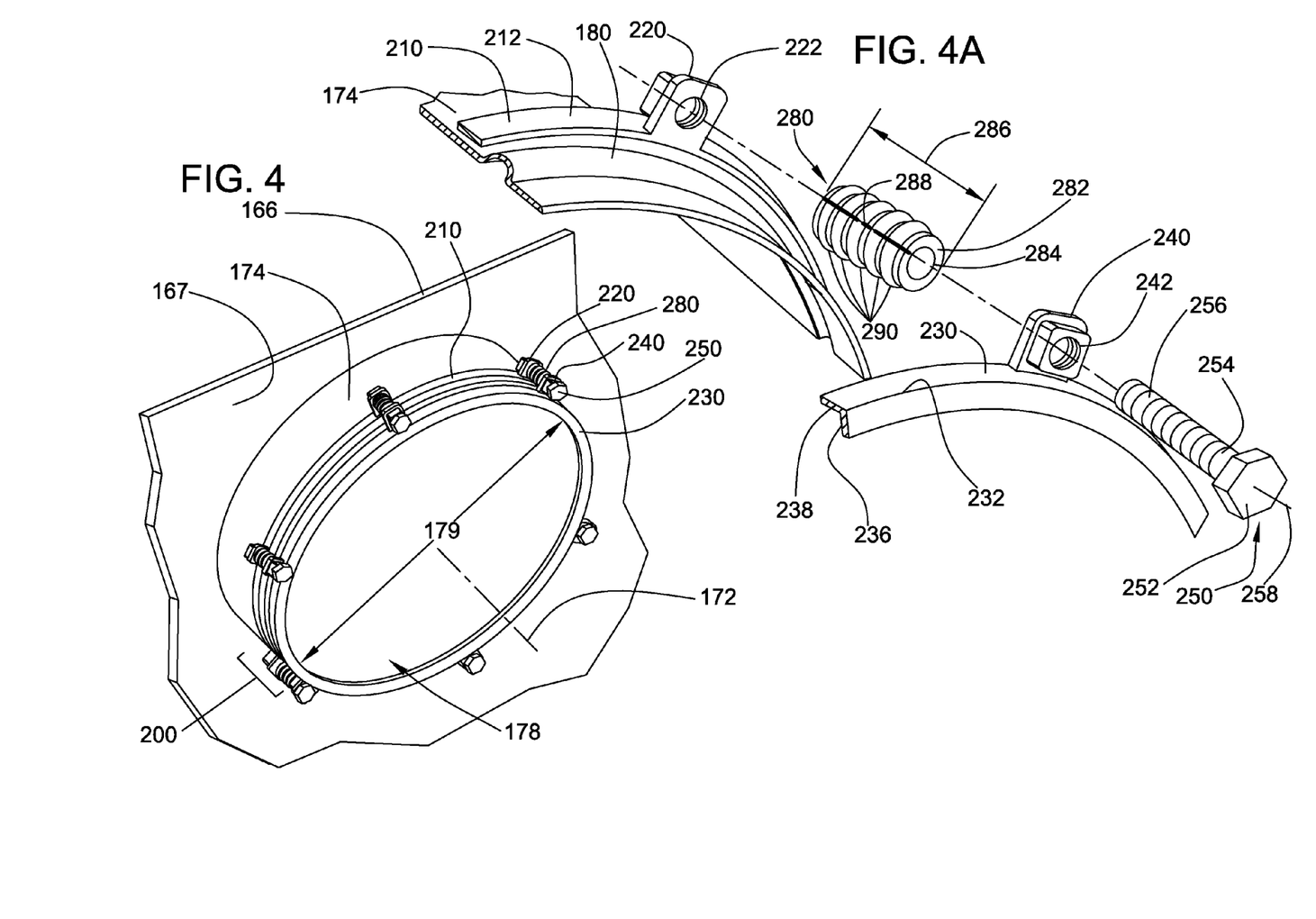
FIG. 4 is a perspective view of the sleeve with a captive ring disposed around and axially confined on the end of the sleeve, the captive ring coupled to a retention ring partially disposed across an opening of the sleeve.
FIG. 4A is a detailed assembly view of the coupling arrangement of FIG. 4 showing the captive ring, the retention ring and the components that couple those elements in detail.

Referring to FIGS. 3 and 4, to releasably engage the first retainer 200 with the sleeve opening 178 disposed in the sleeve 170, the first retainers can include a first ring, designated as a captive ring 210, and a complementary shaped second ring, herein designated as a retention ring 230. The captive ring 210 and the retention ring 230 can releasably couple together to hold the first retainer 200 to the first end 174 of sleeve 170 such that a portion of the sleeve opening 178 is obstructed thereby preventing unintended removal of a SCR catalyst 164. However, the captive ring 210 and the retention ring 230 can be readily decoupled to allow access to the sleeve opening 178 and removal of the SCR catalysts 164 when desired. More specifically, the captive ring 230 is associated with and collared to the first end 174 of the sleeve 170 that protrudes from the planar surface 167 of the frame 166 while the retention ring 176 can be releasably fastened to the captive ring. The releasable coupling and decoupling of the captive ring 210 and the retention ring 230 can be accomplished by, for example, a plurality of fasteners 250. In other embodiments, alternative coupling methods and structures are contemplated such as, for example, clamps adapted to clamp the captive ring and retention ring together.

To collar the captive ring 210 about the sleeve 170, the captive ring can include a thin, continuous band 212 that, in the illustrated embodiment, forms an annular circle. However, in other embodiments, alternative shapes for the captive ring 210 are contemplated, such as in those embodiments in which the sleeve 170 has a different shape. The annular band 212 of the captive ring 210 can have a generally flat shape that extends around and encircles the sleeve axis 172 and can delineate a captive ring inner diameter 214 that is slightly larger than the sleeve diameter 179 associated with the sleeve 170. Accordingly, the captive ring 210 can be loosely disposed about the first end 174 and can freely rotate around the outside of the sleeve 170 with respect to the sleeve axis 172. The captive ring 210 further functions as a loose-fitting collar that can be axially displaced along the portion of the first end 174 of the sleeve 170 that protrudes from the planar surface 167 of the frame 166. Moreover, when disposed about the first end 174, the captive ring 210 is generally concentrically aligned with the sleeve axis 172. The captive ring 210 can be made from any suitable material including, for example, a metallic material such as steel, iron or brass.

To prevent the captive ring 210 from unintentionally sliding off the sleeve 170, the captive ring can be captured or confined along the free end 174 protruding from the planar surface 167 of the frame 166. To confine the captive ring 210, the sleeve 170 can include a radially outward protruding bead 180 formed on and extending along the circumference of the first end 174 and concentrically aligned with the sleeve axis 172. The bead 180 can be oriented toward the sleeve opening 178 in the sleeve 170 and axially spaced apart from the planar surface 167 of the frame 166 through which the first end 174 protrudes. In various embodiments, the bead 180 can be formed by cold working, via a rolling process or the like, the first end 174 of the sleeve 170 to distort or displace the sleeve material radially outward. A possible advantage of forming the bead by a cold working process is an associated increase in strength or rigidity of the first end of the sleeve preventing damage to the protruding first end during servicing of the SCR module. However, in other embodiments, the bead can be formed by alternative methods such as by attaching an additional structure to the sleeve. Although the illustrated example shows the bead 180 extending continuously about the circumference of the first end 174 of the sleeve 170, in other embodiments the bead can be formed as a plurality of intermittent protrusions that are circumferentially spaced around the first end.

Referring to FIG. 3, the radial outward protrusion of the bead 180 can delineate a bead diameter 182 that is greater than both the sleeve diameter 179 and the captive ring inner diameter 214 of the captive ring 210. For example, the bead 180 might protrude approximate 5.0 millimeters from the exterior surface of the tubular sleeve 170 thus adding to the sleeve diameter 179. Accordingly, when the captive ring 210 is disposed around the first end 174 behind the bead 180, axial movement of the captive ring with the smaller captive ring inner diameter 214 along the sleeve 170 is limited by larger bead diameter 182 that prevents the captive ring from sliding over the bead. As illustrated in FIGS. 3 and 4, the axial displacement of the captive ring 210 can be limited to that portion of the first end 174 between the planar wall 167 extending perpendicularly with respect to the sleeve axis 172 and the bead 180. The captive ring 210 is thus captured or trapped on first end 174 of the sleeve 170.

To facilitate coupling the captive ring 210 to the retention ring 230, the captive ring can include a plurality of eyelets 220 disposed circumferentially around and radially extending outward from the horizontally oriented annular band 212. Each eyelet 220 can include a hole 222 disposed through it which can be generally aligned parallel with the sleeve axis 172. The eyelets 220 maybe separately formed and attached to the annular band 212 or may be integrally formed with the band. While the illustrated embodiment shows six eyelets 220, any suitable number can be included. In an alternative embodiment, rather than including eyelets 220, the annular band 212 can be formed substantially thicker with the plurality of holes 222 disposed through the band itself. To secure the fasteners used to couple the captive ring 210 to the retention ring 230, the plurality of holes 222 may be internally threaded so as to mate with the fasteners. Alternatively, the fasteners 250 can be secured to nuts that are placed adjacent to the side of the eyelets 220 directed toward the planar wall 167 of the frame 166.

Referring to FIG. 4, the retention ring 230 can have a size and circular shape complementary to the captive ring 210 and can also include a band 232 formed as an annulus that may be made from a suitable metallic material such as steel, iron or brass. When coupled to the captive ring 210, the retention ring 210 can be held adjacent to and generally engage the distal edge of the first end 174 of the sleeve 170. To facilitate engagement with the first end 174, the cross-section of the annular band 232 can be generally shaped as a right angle with a first leg 236 radially depending inward toward the sleeve axis 172 and a second leg 238 extending rearward from the radial outward edge of the first leg. The second leg 238 is therefore generally parallel to and circumscribes around the sleeve axis 172. Accordingly, referring to FIG. 5, when the retention ring 230 is placed adjacent to the first end 174, the second leg 238 can extend around the periphery of the sleeve opening 178 with the first leg 236 abutting the distal edge of the sleeve opening so that right-angled, annular band 232 sits on the sleeve 170 like a cap.

Referring back to FIG. 3, the annular band 232 can delineate a retention ring inner diameter 234 circumscribed by the inner edge of the first leg 236 that is smaller than the sleeve diameter 179 and the captive ring inner diameter 214. Further, the annular band 232 can delineate a larger retention ring outer diameter 239 corresponding to the diameter of the radially outward second leg 238 that can be generally complementary to the sleeve diameter 179 so that second leg can extend radially around and accommodate the first end 174 of the sleeve. The right-angled annular band 232 can be formed by pressing a blank between appropriate dies in a press.

Referring to FIGS. 3 and 4, the retention ring 230 can include a plurality of tabs 240 disposed circumferentially about the annular band 232 and protruding radially outward of the retention ring outer diameter 239. The number of tabs 240 can correspond to the number of eyelets 220 on the captive ring 210. To accommodate the fasteners 250, there can be disposed through each tab 240 a smooth bore 242 that may be circular in shape and aligned generally parallel to the sleeve axis 172. The bores 242 may be sized to slidably receive the fasteners 250 via a clearance fit. When the retention ring is engaged on the distal first end 174 of the sleeve 170, the bores 242 are generally aligned parallel to the sleeve axis 172. In various embodiments, the tabs 240 can be separately formed and attached to annular band 232 by welding, brazing, or the like, or the tabs can be an integral part of the retention ring 230. Alternatively, the tabs 240 can be eliminated and the bores 242 can be disposed directly though the body of the retention ring 230 itself.

The fasteners 250, in an embodiment, can be elongated, threaded bolts, although in other embodiments other types of fasteners can be used. Each fastener 250 can include a bolt head 252 having an elongated rod 254 extending therefrom with a threaded end 256 distally positioned from the bolt head. The elongated rod 254 of the fastener 250 thereby defines a fastener axis 258 indicating the direction of application. In various embodiments, the bolt head 252 may be a hex head adapted to engage a socket driver or the bolt head may have one or more slots disposed in it to engage a screwdriver.

Figure 5:
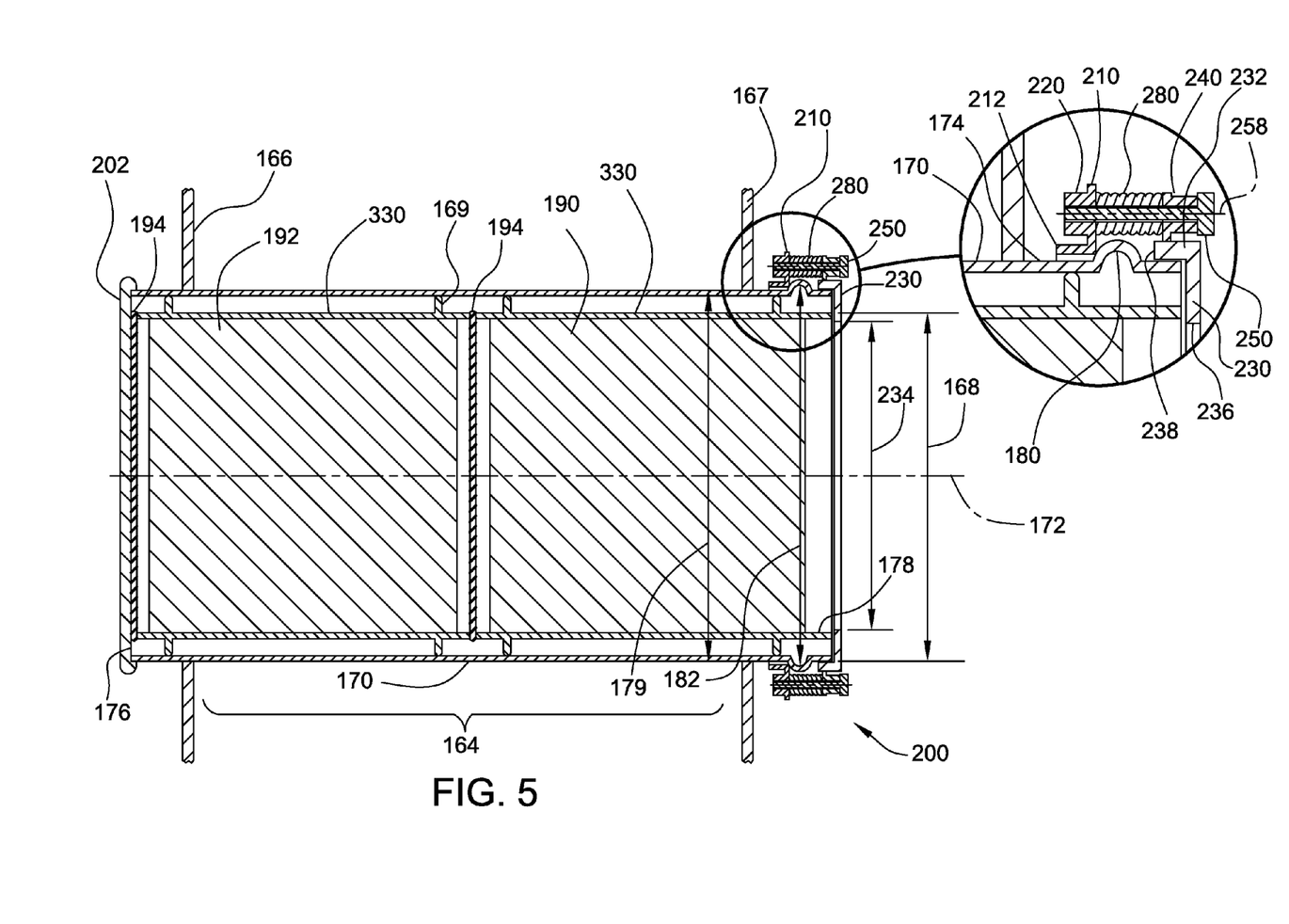
FIG. 5 is a cross-sectional view of the sleeve with the plurality of aftertreatment bricks retained therein by the coupled captive ring and retention ring with the components of the coupling arrangement shown in detail.

Referring to FIGS. 3, 4, and 5, to couple the captive ring 210 and the retention ring 230 together, the retention ring is placed adjacent the sleeve opening 178 in the first end 174 of the sleeve 170. More particularly, the right-angled annular band 232 can extend about the sleeve opening 178 to align and fix the retention ring 230 with respect to the sleeve axis 172 and the first end 174 as described above. Because the retention ring inner diameter 234 of the retention ring 230 is smaller than the sleeve diameter 179 corresponding to the sleeve opening 178, the retention ring can sit against and abut the first end 174. The eyelets 220 on the captive ring 210 can be aligned with the tabs 240 on the retention ring 230, which can be accomplished by rotating the loose fitting captive ring with respect to the sleeve axis 172 and around the sleeve 170. When the eyelets 220 and the tabs 240 are aligned, the fasteners 250 can be inserted through the bores 242 in the tabs and received in the holes 222 disposed in the eyelets. The fasteners 250 can be secured to the holes 222 by, for example, mating with the internally threaded hole or by mating with a nut placed adjacent to the eyelet 220. The fasteners 250 can be tightened to draw the captive ring 210 and the retention ring 230 axially together until the captive ring abuts against the bead 180 disposed about the first end 174, thereby blocking further movement of the captive ring. The bead 180 can thus maintain the captive ring 210 and the retention ring 230 in an axially spaced-apart relation. A result is that the retention ring 230 is held fast to the sleeve 170 and thus first retainer 200 is assembled to the first end 174.

Referring to FIGS. 3, 4, and 4A, in a further embodiment, the first retainer 200 can include an additional component in the form of a compression body 280. The compression body 280 can include a unitary tubular sleeve 282 having a longitudinal bore 284 disposed through it. The longitudinal bore 284 can thereby delineate a longitudinal axis 288, indicated by the heavier centerline. Moreover, the longitudinal bore 284 can be sized and shaped to clearly receive the elongated fastener 250 when the compression body 280 and the longitudinal axis 288 are properly aligned with the fastener axis 258. The compression body 280 can have an initial longitudinal dimension 286, indicated in FIG. 4 by the arrow. When used with the first retainer 200, the compression body 280 may be disposed between the tab 240 projecting from the retention ring 210 and the eyelet 220 on the captive ring 210.

Formed in the compression body 280 can be a plurality of adjacent, collapsible beads 290, arranged longitudinally and aligned along the longitudinal axis 288. The rounded collapsible beads 290 may provide the compression body 280 with a buckled or corrugated surface. To form the collapsible beads 290, the tubular sleeve 282 may be initially cylindrical and may be cold worked into the beaded shape by a turning operation. If the compression body 280 is placed under an axially compressive force asserted, for example, between the eyelets 220 on the captive ring 210 and the tabs 240 on the retention ring 230, the adjacent collapsible beads 290 can begin to collapse together with respect to the longitudinal axis 288, similarly to the collapsing of a bellows. Accordingly, the tubular body 282 may begin to crush or collapse with respect to its initial longitudinal dimension 286 to a shorter dimension. In return, the collapsible beads 290 may provide a resistive force or counter compressive force in the direction of the longitudinal axis 288.

When the compression body 280 is compressed between the eyelet 220 and the tab 240, this force may be applied to the other components of the first retainer 200 such as the fastener 250 threaded into the eyelets 220, preloading these components and preventing them from unintentionally loosening with respect to each other. Additionally, the counter-force may cause the retention ring 210 and the first end 174 to urge against each other holding those components in rigid alignment. The number of adjacent collapsible beads 290 and the size of the beads can be varied to provide for different ranges of collapse (i.e. different changes in the initial longitudinal dimension 286) and different degrees of counterforce. The compression body 280 may therefore act or function as a spring or tensioning mechanism. To enable the compression body 280 to collapse, the tubular sleeve 282 can be made from a relatively more pliable or yieldable grade of material than the other components of the first retainer 200, such as a lower grade of stainless steel. In other embodiments, other devices like springs may be used to provide the counterforce.

Figure 6:
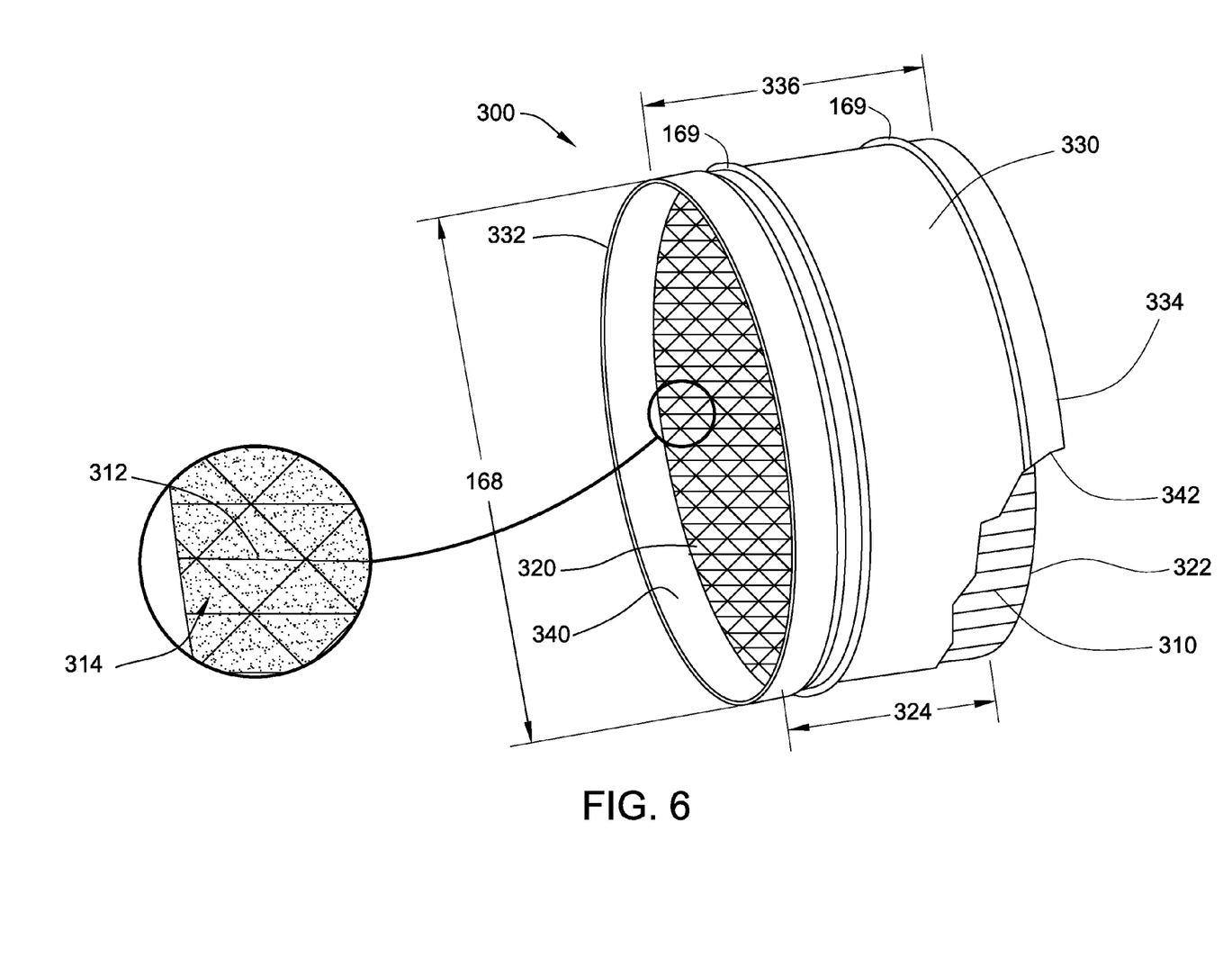
FIG. 6 is a perspective view of an embodiment of an aftertreatment brick, in particular a selective catalytic reduction catalyst, having a mantle disposed around a substrate matrix with the substrate matrix illustrated in detail.

As stated elsewhere, the disclosure may be applied to retaining any suitable type of aftertreatment brick in an aftertreatment system. Referring to FIG. 6, for example, there is illustrated an embodiment of a suitable aftertreatment brick and, specifically, a SCR catalyst 300 that can perform an SCR reaction. To support the catalytic material that performs the chemical reaction, the SCR catalyst 300 can include an internal substrate matrix 310 made of a triangular lattice, honeycomb lattice, metal mesh substrate, or similar thin-walled support structure 312 onto which the catalytic material or catalytic coating 314 can be disposed. Such designs for the support structures enable the exhaust gas/reductant agent mixture to pass into and through the SCR catalyst 300. Any suitable material can be used for the support structure 312 including, for example, ceramics, titanium oxide, or copper zeolite. Catalytic coatings 314 that initiate the SCR reaction can include various types of metals such as vanadium, molybdenum and tungsten. The catalytic coating 314 can be deposited on the support structure 312 by any suitable method including, for example, chemical vapor deposition, adsorption, powder coating, spraying, etc. In other embodiments, instead of having separate support structures and catalytic coatings that are often employed together to reduce material costs, the substrate matrix can be made entirely from a catalytic material. In the illustrated embodiment, the substrate matrix 310 has a generally cylindrical shape and extends between a first circular face 320 and a second circular face 322 to delineate a first length 324, however, in other embodiments, different shapes can be applied to the substrate matrix, e.g., square, rectangular, etc. By way of example only, the first length may be about seven (7) inches.

To protect the support structure 312, a tubular mantle 330 can be generally disposed around the substrate matrix 310. The tubular mantle 330 can be made of a thicker or more rigid material than the thin-walled support structure 312, such as aluminum or steel. For example, the mantle may be about 5/16 of an inch thick to provide sufficient structural rigidity to the catalyst. The outer circumference of the mantle 330 may correspond to the catalyst diameter 168 sized for accommodation in the sleeves. Dispose around the exterior of the mantle 330 can be the protruding ribs 169 that can contact the inner wall of the sleeve. The tubular mantle 330 can have a shape complementary to that of the substrate matrix 310 that, in the illustrated embodiment, is generally cylindrical. The cylindrical mantle 330 can therefore extend between a first circular rim 332 and a second circular rim 334, whose diameter also corresponds to the catalyst diameter 168. However, in other embodiments the mantle and its first and second rims can have other shapes. The mantle can have a second length 336 delineated between the first rim 332 and the second rim 334 that is slightly larger than the first length 324 of the substrate matrix 310. By way of example only, the second length 336 may be approximately eight (8) inches.

Accordingly, when disposed around the shorter substrate matrix 310, the mantle 330 can have an overhanging extension or lip 340 protruding beyond at least the first face 320 of the substrate matrix. The lip 340 therefore extends the first rim 332 a short distance beyond the first face 320. In those embodiments in which the shorter substrate matrix 310 is centered at a mid-length position with respect to the longer mantle 330, a second lip 342 may protrude beyond the second face 322 of the matrix and extend the second rim 334 from the second face. For the examples given above, with the length of the substrate matrix 310 being 7 inches and the length of the mantle being 8 inches, the first and second lips 340, 342 may be on the order of one-half inch (½) inch. Accordingly, the first and second faces 320, 322 of the thin-walled substrate matrix 310 are set back one-half inch into the outer protective mantle 330.

INDUSTRIAL APPLICABILITY

As stated above, the present disclosure is directed to releasably retaining one or more aftertreatment bricks in an aftertreatment system such as the large exhaust aftertreatment system 120 or CEM illustrated in FIG. 1. Referring to FIG. 5, to accommodate the SCR catalysts 164, the aftertreatment system can include one or more tubular sleeves 170 into which a plurality of complementary shaped SCR catalysts 164 can be inserted through a sleeve opening 178 defined at a first end 174 of the sleeve. The plurality of aftertreatment bricks can include at least a first SCR catalyst 190 oriented toward the first end 174 of the sleeve and a second SCR catalyst 192 oriented toward the second end 176, although in other embodiments different numbers of catalysts can be included. Because the complementary shape between the SCR catalysts 164 and the sleeve 170 and, more specifically, because of a sliding fit between an circumferential rib 169 on the SCR catalysts and inner tubular wall of the sleeve, the catalysts are concentrically aligned with the longitudinal sleeve axis 172 delineated by the elongated sleeve. To prevent the SCR catalysts 164 from unintentionally exiting the sleeve 170, first and second retainers 200, 202 can be attached at the respective first and second ends 174, 176 of the sleeve. However, because the SCR catalysts 164 might need to be retrieved from the sleeve 170 for servicing or replacement, at least a portion of the first retainer 200 is readily releasable from the first end 174 so as to allow operator access to the SCR catalysts through the sleeve opening 178.

To facilitate the releasable engagement to the sleeve 170, as described above, the first retainer 200 includes a captive ring 210 associated with the first end 174 of the sleeve that can couple and decouple with a retention ring 230 that can obstruct a portion of the sleeve opening 178. In particular, the captive ring 210 can encircle the first end 174 and is held thereto as a generally loose-fitting collar. To retain the captive ring 210 along the first end 174, the sleeve 170 can include a circumferentially extending, radially outward protruding bead 180 that circumscribes the axis line 172 and is disposed toward the sleeve opening 178. The bead 180 can have a bead diameter 182 larger than a captive ring inner diameter so that the captive ring is unable to pass over the bead. A possible advantage of capturing the captive ring on the first end in the foregoing manner is that loose fitted ring allows for thermal expansion and contraction of the sleeve during operation.

The retention ring 230 can have a shape similar to the captive ring 210 but with a retention ring inner diameter 234 that is less than the sleeve diameter 179 associated with the sleeve opening 178 of the sleeve 170. To couple the captive ring 210 and the retention ring 230 together, the retention ring 230 is placed adjacent to the sleeve opening 178 abutting against the distal first end 174 of the sleeve 170. The loose fitting captive ring 210 can be rotated relative to the retention ring 230 to align a plurality of eyelets 220 circumferentially disposed on the captive ring with a corresponding plurality of tabs 240 circumferentially disposed on the retention ring. Fasteners 250 can be directed through bores disposed in the tabs 240 and into threaded holes disposed in the eyelets 220. Because the fasteners engage the loose fitting captive ring, the first retainer 200 can accommodate greater degrees of thermal-induced stresses as opposed to an arrangement in which fasteners are directly engaged to first end 174 of the sleeve 170. Tightening the fasteners 250 draws the captive ring 210 axially toward the retention ring 230 until the annular band 212 of the captive ring abuts against the bead 180, preventing further axially movement of the captive ring with respect to the sleeve axis 172. The first retainer 200 is thereby assembled on the sleeve 170.

Due to the smaller retention ring inner diameter 234 compared to the sleeve diameter 179, a portion of the retention ring can extend radially inward obstructing at least a portion of the sleeve opening 178 through the sleeve 170. Because the retention ring 230 is held in concentric alignment with the sleeve 170 and SCR catalysts therein, the inner periphery of the retention ring 230 extending radially inward of the sleeve opening 178 can contact and abut the tubular mantle 330 of the first SCR catalyst 190 oriented in the first end 174 of the sleeve. Accordingly, the retention ring blocks the SCR catalysts from exiting the sleeve opening thereby retaining the catalyst in the sleeve.

If the combined length of the SCR catalysts 164 is generally coextensive with the axial length of the sleeve 170, abutment between the retention ring 230 and the aftertreatment bricks can constrain axial movement of the catalysts and possibly direct an axially compressive force through the adjacent catalysts to prevent relative movement between the catalysts that could result in damage. The axially force may be transferred through the abutting mantles of the SCR catalysts rather than the relatively weaker substrate matrices thereby avoiding damage to the matrices. In those embodiments that include gaskets 194 between the SCR catalysts, the compressive force can facilitate gas-tight sealing between adjacent catalysts. Further, in embodiments utilizing the compression bodies 280, the circumferentially arranged compression bodies can collapse at different relative degrees to accommodate tolerance stack-ups between the SCR catalysts. The spring forces exerted by the compression bodies 280 can accommodate thermal expansion and contraction of the catalysts, and may account for creep or set between the components overtime.

To remove the first retainer 200 to, for example, remove and replace a depleted aftertreatment brick, the fasteners 250 can be unfastened to decouple the retention ring 230 from the captive ring 210. SCR catalysts 164 can be retrieved and inserted through the unobstructed sleeve opening 178. If possible, the fasteners 250 can be reused to re-couple the captive ring 210 and retention ring 230 together. However, due to the operating conditions of the aftertreatment module, including exposure to hot exhaust gasses and possible corrosive reductant agent, the metal components may undergo a galling process over time in which adjacent surfaces of the components adhere at a microscopic level and materials transfer or join between the components. Another possibility is that possibly corrosive compositions in the exhaust gasses and/or reductant agent may corrode the components of the clamping assembly together. In such instances, it may be necessary to sever the fasteners 250 with, for example, cutters, saws, grinders, torches and the like. The relatively inexpensive fasteners can be replaced with a fastener from a kit of replacement parts or the like.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An aftertreatment module comprising:
   at least one sleeve extending between a first end and an opposing second end along a sleeve axis, the at least one sleeve including a sleeve opening at the first end and a bead proximate the first end protruding radially outward about the sleeve axis;
   a frame including a planar surface perpendicular to the sleeve axis, the frame accommodating the at least one sleeve such that the first end extends from the planar surface and the bead is axially spaced from the planar surface;
   one or more aftertreatment bricks inserted in the at least one sleeve, each of the aftertreatment bricks including a substrate matrix and a mantle disposed around the substrate matrix;
   a captive ring disposed around the sleeve and axially positioned between the planar surface and the bead; and
   a retention ring disposed adjacent the first end and coupled with the captive ring, the retention ring shaped such that a portion of the retention ring is disposed over a portion of the sleeve opening.

2. The aftertreatment module of claim 1, wherein the sleeve is a tubular cylinder, and the captive ring and the retention ring are generally annular.

3. The aftertreatment module of claim 2, wherein the captive ring rotates freely around the sleeve axis when not coupled to the retention ring.

4. The aftertreatment module of claim 3, wherein the retention ring includes an inner diameter that is less than a sleeve diameter associated with the sleeve opening such the portion of the retention ring disposed over the sleeve opening abuts the mantle of the one or more aftertreatment bricks.

5. The aftertreatment module of claim 4, wherein the captive ring and the retention ring are coupled together by a plurality of fasteners.

6. The aftertreatment module of claim 5, wherein the retention ring includes a plurality of bores, each of the plurality of bores for accommodating a fastener such that the fastener is aligned generally parallel to the sleeve axis.

7. The aftertreatment module of claim 6, wherein the captive ring includes a plurality of eyelets, each eyelet receiving the fastener accommodated in a bore.

8. The aftertreatment module of claim 7, wherein the plurality of eyelets are threaded for threaded mating with the plurality of fasteners.

9. The aftertreatment module of claim 8, further comprising a compression body disposed between the bore and an eyelet.

10. The aftertreatment module of claim 9, wherein the compression body includes a plurality of collapsible beads arranged longitudinally with respect to the compression body.

* * * * *